US012784665B2

(12) United States Patent
Choi et al.

(10) Patent No.: US 12,784,665 B2
(45) Date of Patent: Nov. 3, 2026

(54) DISPLAY DEVICE AND ELECTRONIC DEVICE

(71) Applicant: Samsung Display Co., LTD., Yongin-si (KR)

(72) Inventors: Jinsung Choi, Yongin-si (KR); Seung-Kyu Lee, Yongin-si (KR); Minjun Kim, Yongin-si (KR); Jaejune Park, Yongin-si (KR); Minseong Son, Yongin-si (KR); Junyi Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/262,451

(22) Filed: Jul. 8, 2025

(65) Prior Publication Data

US 2026/0212802 A1 Jul. 23, 2026

(30) Foreign Application Priority Data

Jan. 20, 2025 (KR) ........................ 10-2025-0007880

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/0267* (2013.01); *G09G 2310/0275* (2013.01); *G09G 2310/08* (2013.01); *G09G 2320/0209* (2013.01); *G09G 2330/021* (2013.01)

(58) Field of Classification Search
CPC ............... G09G 3/32; G09G 2300/043; G09G 2300/0819; G09G 2310/0267; G09G 2310/0275; G09G 2310/08; G09G 2320/0209; G09G 2330/021
USPC ...................................................... 345/55, 76
See application file for complete search history.

(56) References Cited

U.S. PATENT DOCUMENTS

| | | | | |
|---|---|---|---|---|
| 11,120,742 B2* | 9/2021 | Hwang | ................ | G09G 3/3258 |
| 11,783,774 B2* | 10/2023 | Song | .................... | G09G 3/3291<br>345/691 |
| 2021/0043149 A1* | 2/2021 | Yoo | ...................... | G09G 3/3291 |
| 2024/0096275 A1 | 3/2024 | Gandhi et al. | | |
| 2024/0135864 A1* | 4/2024 | Lee | .......................... | G09G 3/32 |

* cited by examiner

*Primary Examiner* — Jimmy H Nguyen
(74) *Attorney, Agent, or Firm* — CANTOR COLBURN LLP

(57) ABSTRACT

A display device includes a display panel including a plurality of pixels in a display region, and a feedback line connected to a point within the display region, and a panel driver configured to drive the display panel. Each of the plurality of pixels generates an emission current based on a voltage difference between a data voltage and a reference voltage, and emits light with a luminance corresponding to the emission current. The panel driver receives the reference voltage at the point within the display region as a feedback reference voltage through the feedback line, and adjusts the data voltage according to the feedback reference voltage.

20 Claims, 15 Drawing Sheets

DISPLAY DEVICE AND ELECTRONIC DEVICE

This application claims priority to Korean Patent Application No. 10-2025-0007880 filed on Jan. 20, 2025, and all the benefits accruing therefrom under 35 U.S.C. § 119, the content of which in its entirety is herein incorporated by reference.

1. Technical Field

Embodiments of the present disclosure relate to a display device, and more particularly to a display device including a feedback line and an electronic device including the display device.

2. Description of the Related Art

A display device may include a display panel that includes a plurality of pixels, a data driver that provides data voltages to the plurality of pixels, a scan driver that provides scan signals to the plurality of pixels, an emission driver that provides emission signals to the plurality of pixels, and a controller that controls the data driver, the scan driver and the emission driver.

Recently, a pixel has been developed in which a driving transistor generates an emission current based on a voltage difference between a data voltage and a reference voltage, and a light-emitting element emits light based on the emission current corresponding to the voltage difference. In the pixel, a current level of the emission current may be determined according to a voltage level of the data voltage in a case where the reference voltage has a constant voltage level, and a luminance of the pixel may be determined according to the current level of the emission current or the voltage level of the data voltage.

SUMMARY

Some embodiments provide a display device capable of preventing or reducing a crosstalk defect caused by a change or a ripple of a reference voltage.

Some embodiments provide an electronic device including the display device.

According to embodiments, there is provided a display device including a display panel including a plurality of pixels in a display region, and a feedback line connected to a point within the display region, and a panel driver configured to drive the display panel. Each of the plurality of pixels generates an emission current based on a voltage difference between a data voltage and a reference voltage, and emits light with a luminance corresponding to the emission current. The panel driver receives the reference voltage at the point within the display region as a feedback reference voltage through the feedback line, and adjusts the data voltage according to the feedback reference voltage.

In embodiments, the panel driver may increase the data voltage as the feedback reference voltage increases, and may decrease the data voltage as the feedback reference voltage decreases.

In embodiments, the panel driver may include a power management circuit configured to generate the reference voltage, a gamma top voltage and a gamma bottom voltage, a data driver configured to generate the data voltage based on the gamma top voltage and the gamma bottom voltage, and to provide the data voltage to each of the plurality of pixels, and a controller configured to control the power management circuit and the data driver.

In embodiments, the controller may receive the feedback reference voltage through the feedback line, and may generate a gamma control signal based on the feedback reference voltage. The power management circuit may adjust the gamma top voltage and the gamma bottom voltage in response to the gamma control signal. The data driver may adjust the data voltage based on the adjusted gamma top voltage and the adjusted gamma bottom voltage.

In embodiments, as the feedback reference voltage increases, the controller may generate the gamma control signal, which indicates that the gamma top voltage and the gamma bottom voltage are to be increased, the power management circuit may increase the gamma top voltage and the gamma bottom voltage in response to the gamma control signal, and the data driver may increase the data voltage based on the increased gamma top voltage and the increased gamma bottom voltage.

In embodiments, when the feedback reference voltage increases by a voltage increase amount, the power management circuit may increase each of the gamma top voltage and the gamma bottom voltage by the voltage increase amount, and the data driver may increase the data voltage by the voltage increase amount based on the increased gamma top voltage and the increased gamma bottom voltage.

In embodiments, the panel driver may further include a scan driver configured to provide a write signal, a compensation signal, an initialization signal and a bypass signal to each of the plurality of pixels, and an emission driver configured to provide an emission signal to each of the plurality of pixels.

In embodiments, each of the plurality of pixels may include a first capacitor including a first electrode which receives a first power supply voltage, and a second electrode connected to a first node, a second capacitor including a first electrode connected to the first node, and a second electrode connected to a second node, a first transistor configured to generate the emission current based on a voltage of the second node, a second transistor configured to transfer the data voltage to the first node in response to a write signal, a third transistor configured to diode-connect the first transistor in response to a compensation signal, a fourth transistor configured to apply an initialization voltage to the second node in response to an initialization signal, a fifth transistor configured to apply the reference voltage to the first node in response to the compensation signal, and a light-emitting element configured to emit light based on the emission current.

In embodiments, the first transistor may include a gate connected to the second node, a first terminal which receives the first power supply voltage, and a second terminal. The second transistor may include a gate which receives the write signal, a first terminal connected to a data line, and a second terminal connected to the first node. The third transistor may include a gate which receives the compensation signal, a first terminal connected to the second terminal of the first transistor, and a second terminal connected to the second node. The fourth transistor may include a gate which receives the initialization signal, a first terminal connected to the second node, and a second terminal which receives the initialization voltage. The fifth transistor may include a gate which receives the compensation signal, a first terminal connected to the first node, and a second terminal which receives the reference voltage. The light-emitting element may include an anode connected to the second terminal of the first transistor, and a cathode which receives a second power supply voltage.

In embodiments, each of the plurality of pixels may further include a sixth transistor located between the first transistor and the light-emitting element, and configured to connect the first transistor and the light-emitting element in response to an emission signal, and a seventh transistor configured to apply the initialization voltage to the light-emitting element in response to a bypass signal.

In embodiments, the sixth transistor may include a gate which receives the emission signal, a first terminal connected to the first transistor, and a second terminal connected to the light-emitting element. The seventh transistor may include a gate which receives the bypass signal, a first terminal connected to the light-emitting element, and a second terminal which receives the initialization voltage.

In embodiments, a frame period for the display device may include a gate initialization period in which the second node is initialized, a compensation period in which a threshold voltage compensation operation for the first transistor is performed, a writing period in which the data voltage is provided to each of the plurality of pixels, an anode initialization period in which the light-emitting element is initialized, and an emission period in which the light-emitting element emits light based on the emission current.

According to embodiments, there is provided a display device including a display panel including a plurality of pixels in a display region, and a plurality of feedback lines connected to a plurality of points, respectively, within the display region, and a panel driver configured to drive the display panel. Each of the plurality of pixels generates an emission current based on a voltage difference between a data voltage and a reference voltage, and emits light with a luminance corresponding to the emission current. The panel driver receives the reference voltage within the display region as a feedback reference voltage through one feedback line among the plurality of feedback lines, and adjusts the data voltage according to the feedback reference voltage.

In embodiments, the panel driver may increase the data voltage as the feedback reference voltage increases, and may decrease the data voltage as the feedback reference voltage decreases.

In embodiments, the panel driver may include a power management circuit configured to generate the reference voltage, a gamma top voltage and a gamma bottom voltage, a data driver configured to generate the data voltage based on the gamma top voltage and the gamma bottom voltage, and to provide the data voltage to each of the plurality of pixels, and a controller configured to control the power management circuit and the data driver. The controller may be connected to the one feedback line among the plurality of feedback lines, and may not be connected to remaining feedback lines among the plurality of feedback lines.

In embodiments, the one feedback line connected to the controller may be selected according to a crosstalk characteristic of the display panel from among the plurality of feedback lines.

According to embodiments, there is provided an electronic device including a processor, a memory connected to the processor, a power module connected to the processor, and a display device configured to receive input image data from the processor, and to display an image based on the input image data. The display device includes a display panel including a plurality of pixels in a display region, and a feedback line connected to a point within the display region, and a panel driver configured to drive the display panel. Each of the plurality of pixels generates an emission current based on a voltage difference between a data voltage and a reference voltage, and emits light with a luminance corresponding to the emission current. The panel driver receives the reference voltage at the point within the display region as a feedback reference voltage through the feedback line, and adjusts the data voltage according to the feedback reference voltage.

In embodiments, the panel driver may increase the data voltage as the feedback reference voltage increases, and may decrease the data voltage as the feedback reference voltage decreases.

In embodiments, the panel driver may include a power management circuit configured to generate the reference voltage, a gamma top voltage and a gamma bottom voltage, a data driver configured to generate the data voltage based on the gamma top voltage and the gamma bottom voltage, and to provide the data voltage to each of the plurality of pixels, and a controller configured to control the power management circuit and the data driver.

In embodiments, the controller may receive the feedback reference voltage through the feedback line, and may generate a gamma control signal based on the feedback reference voltage. The power management circuit may adjust the gamma top voltage and the gamma bottom voltage in response to the gamma control signal. The data driver may adjust the data voltage based on the adjusted gamma top voltage and the adjusted gamma bottom voltage.

As described above, in a display device and an electronic device according to embodiments, a panel driver may receive a reference voltage at a point within a display region as a feedback reference voltage through a feedback line, and may adjust a data voltage according to the feedback reference voltage. Accordingly, a crosstalk defect caused by a change or a ripple of the reference voltage may be effectively prevented or reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "connected to" another element, it can be directly connected to the other element or intervening elements may be present therebetween. In contrast, when an element is referred to as being "directly connected to" another element, there are no intervening elements present. Hereinafter, embodiments of the present invention will be explained in detail with reference to the accompanying drawings.

Figure 1:
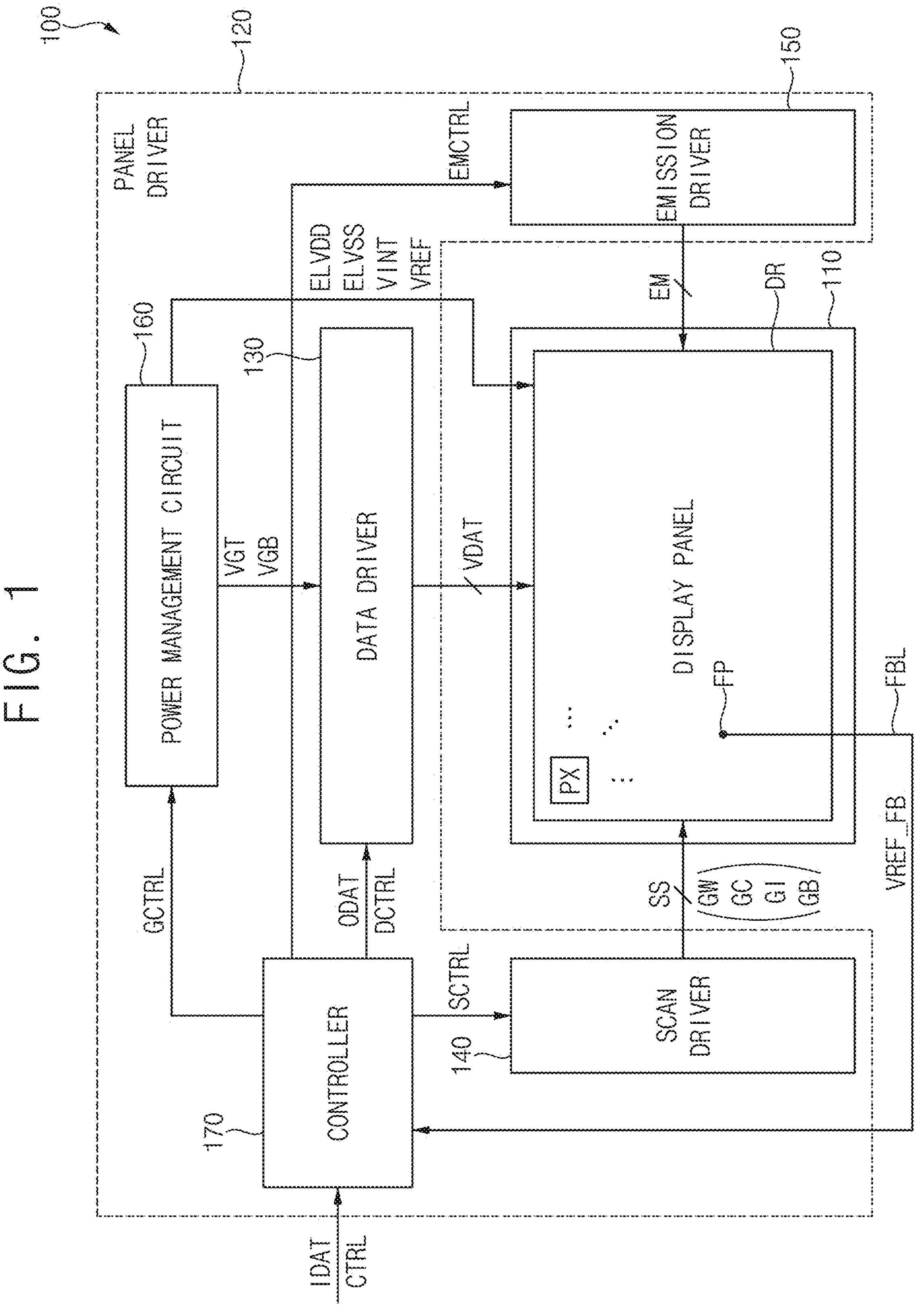
FIG. 1 is a block diagram illustrating a display device according to embodiments.
Figure 2:
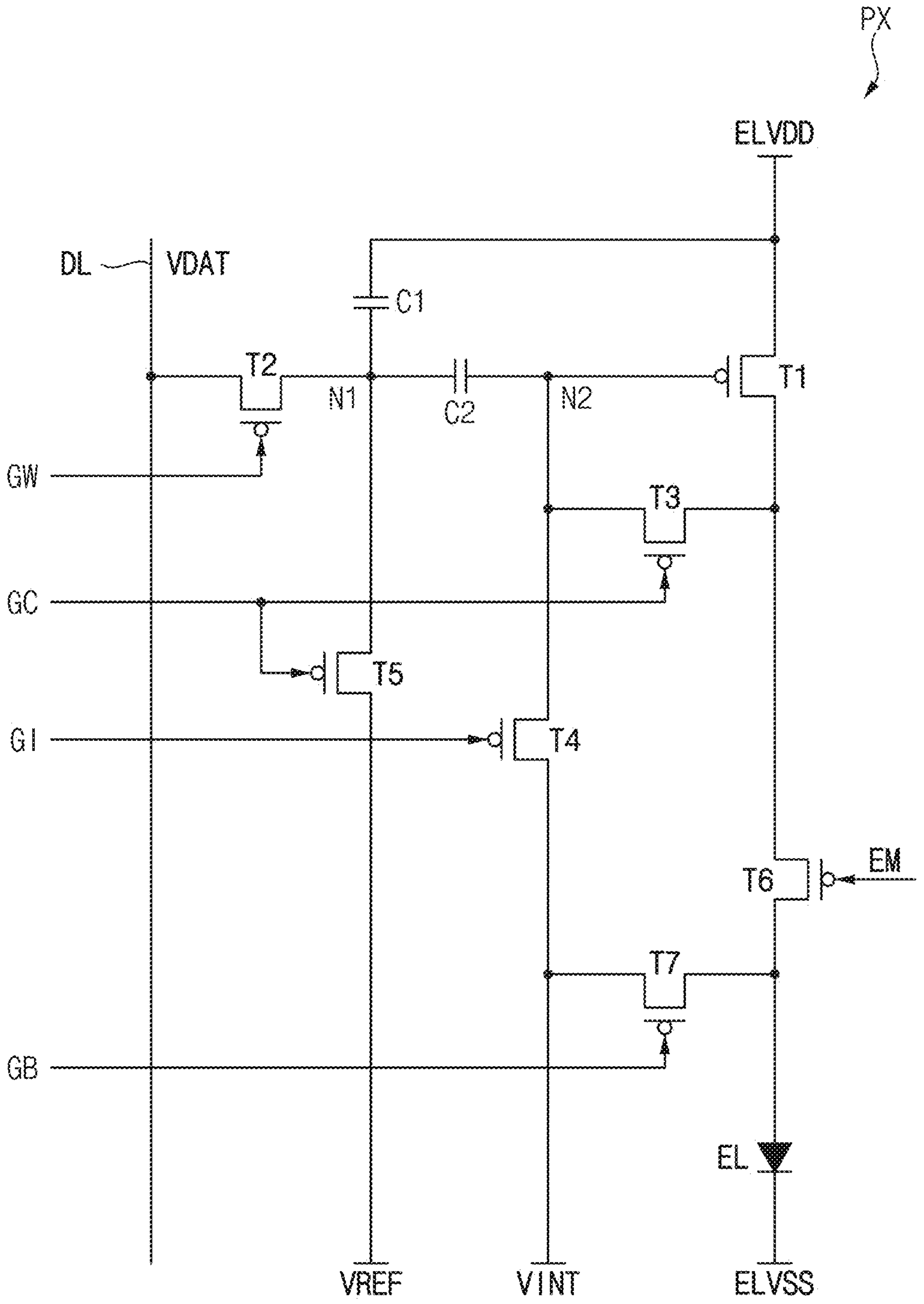
FIG. 2 is a circuit diagram illustrating an example of a pixel included in a display device according to embodiments.
Figure 3:
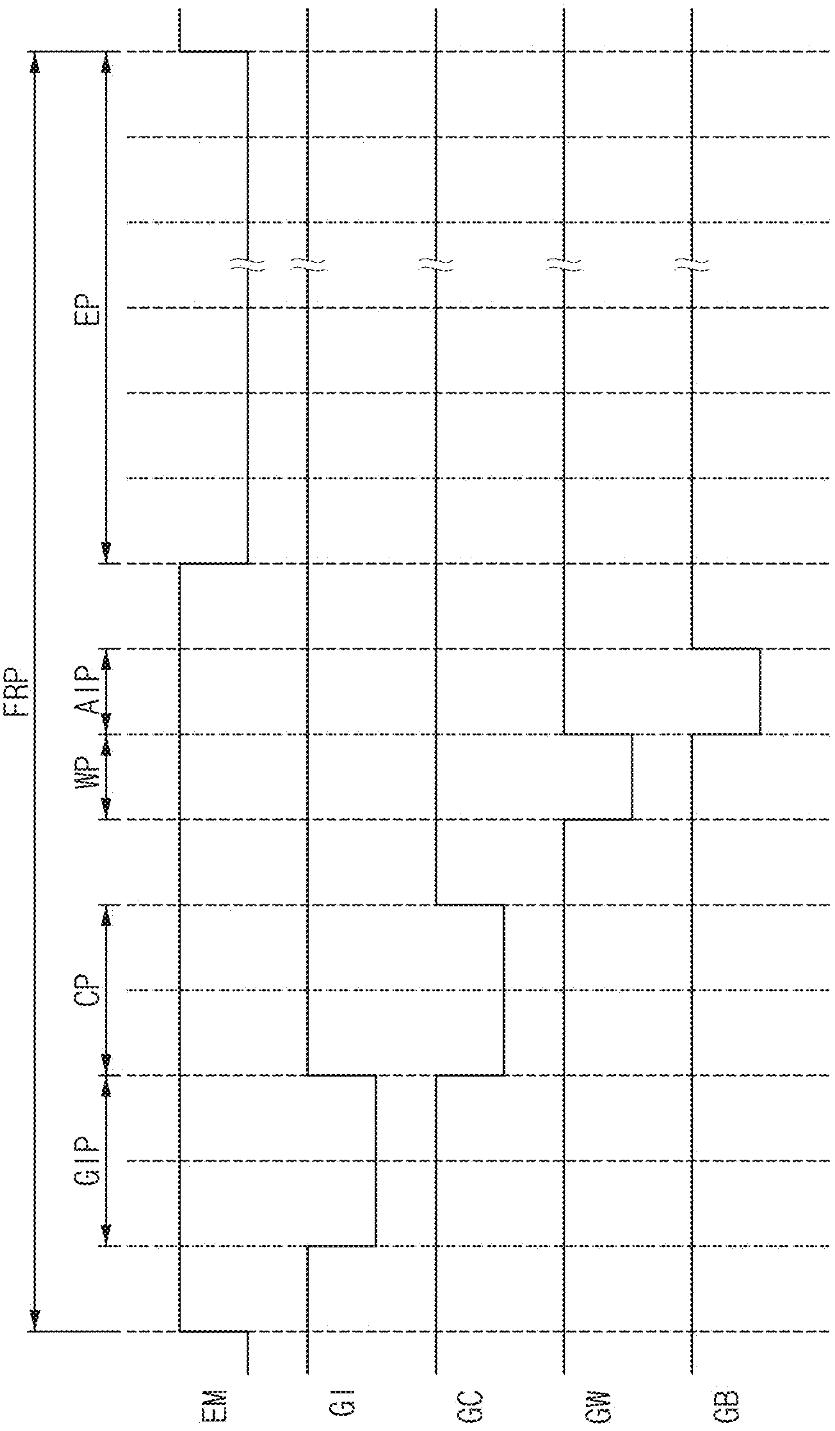
FIG. 3 is a timing diagram for describing an example of an operation of a pixel of FIG. 2.
Figure 4:
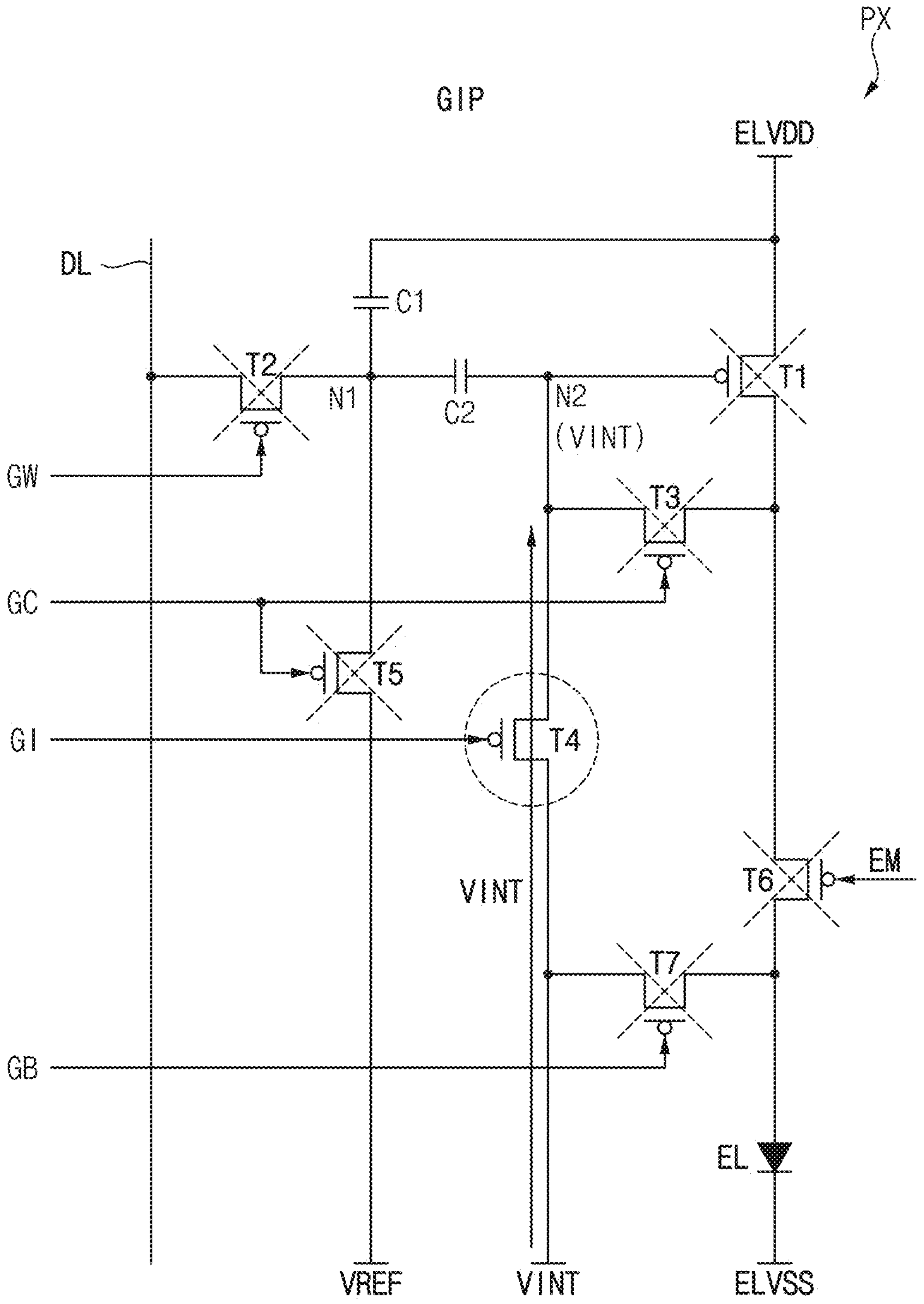
FIG. 4 is a circuit diagram for describing an example of an operation of a pixel of FIG. 2 in a gate initialization period.
Figure 5:
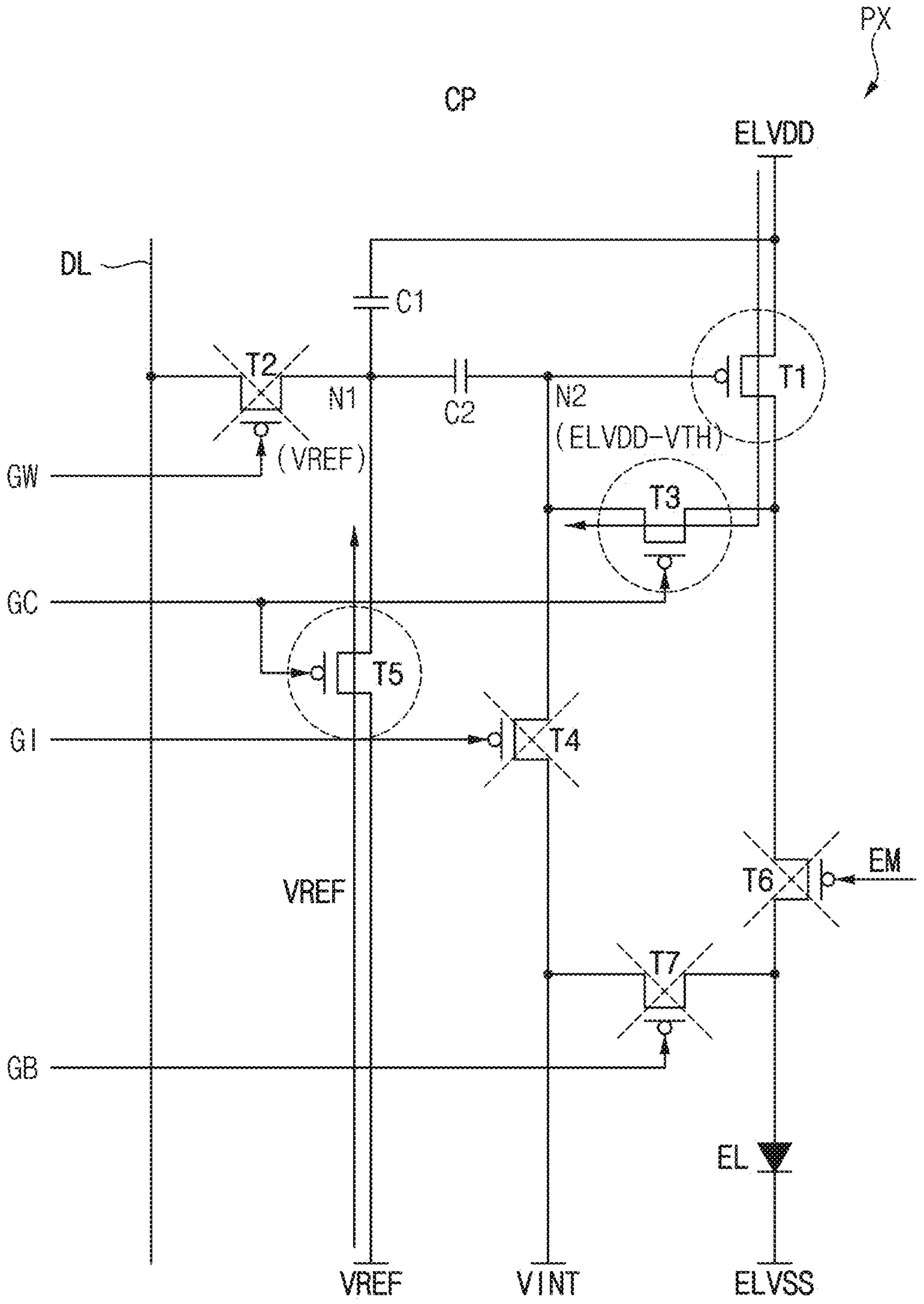
FIG. 5 is a circuit diagram for describing an example of an operation of a pixel of FIG. 2 in a compensation period.
Figure 6:
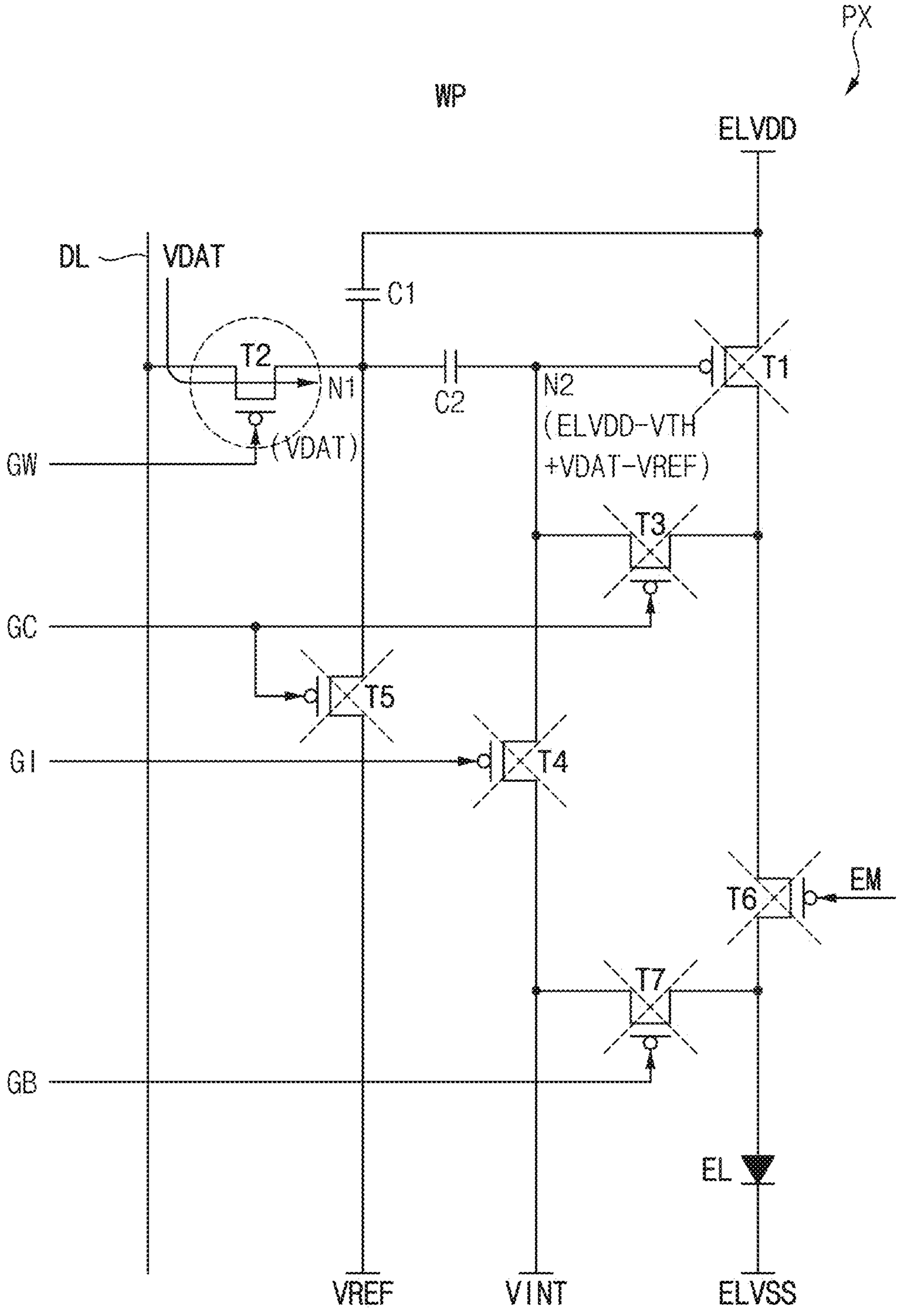
FIG. 6 is a circuit diagram for describing an example of an operation of a pixel of FIG. 2 in a writing period.
Figure 7:
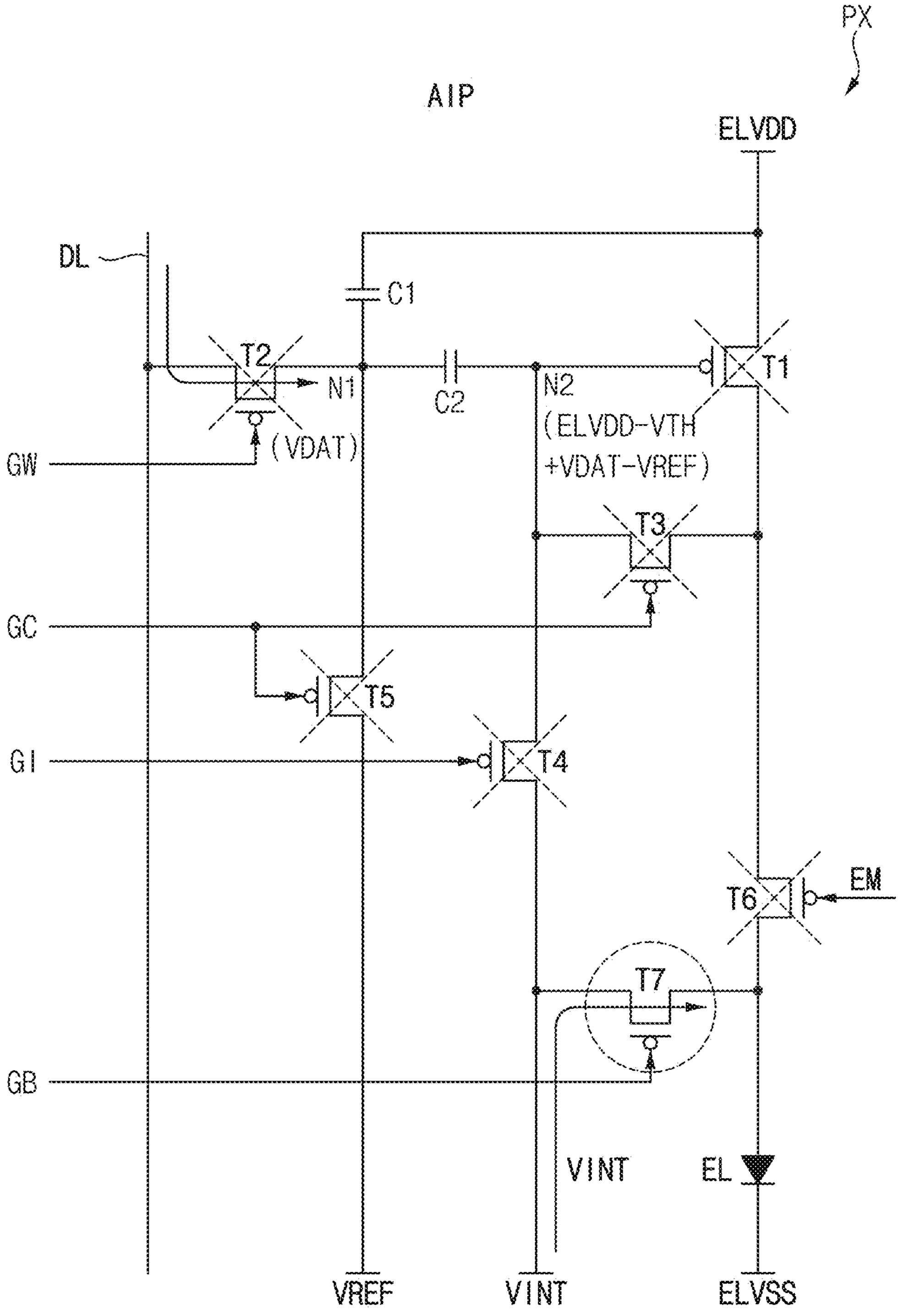
FIG. 7 is a circuit diagram for describing an example of an operation of a pixel of FIG. 2 in an anode initialization period.
Figure 8:
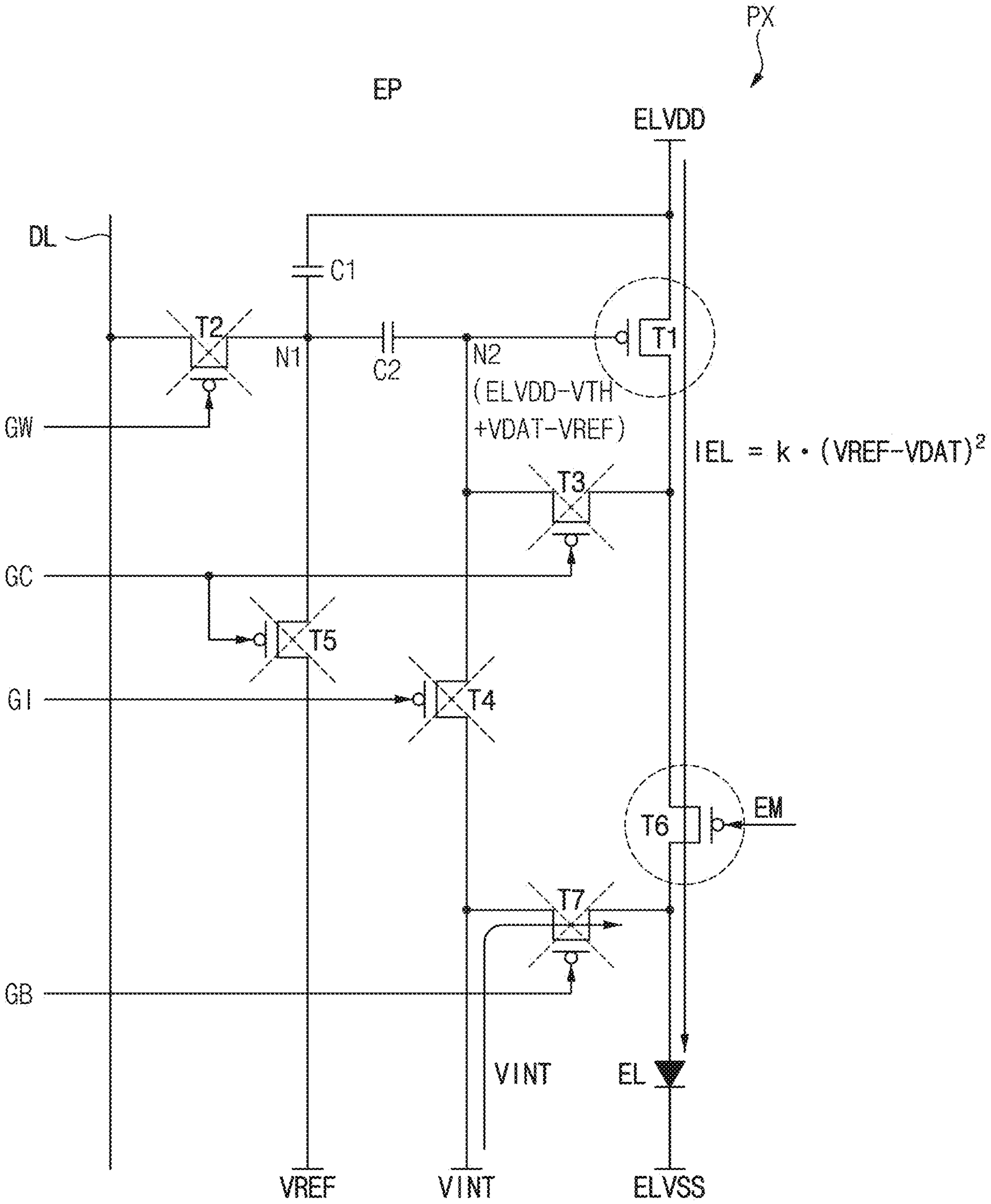
FIG. 8 is a circuit diagram for describing an example of an operation of a pixel of FIG. 2 in an emission period.
Figure 9:
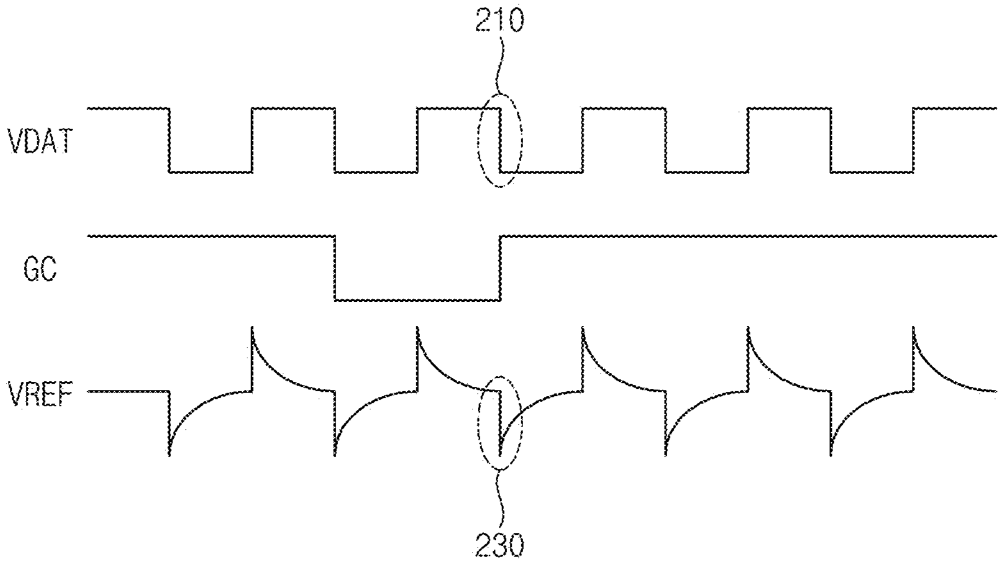
FIG. 9 is a timing diagram for describing an example of a change or a ripple of a reference voltage according to a change or a transition of a data voltage.
Figure 10:
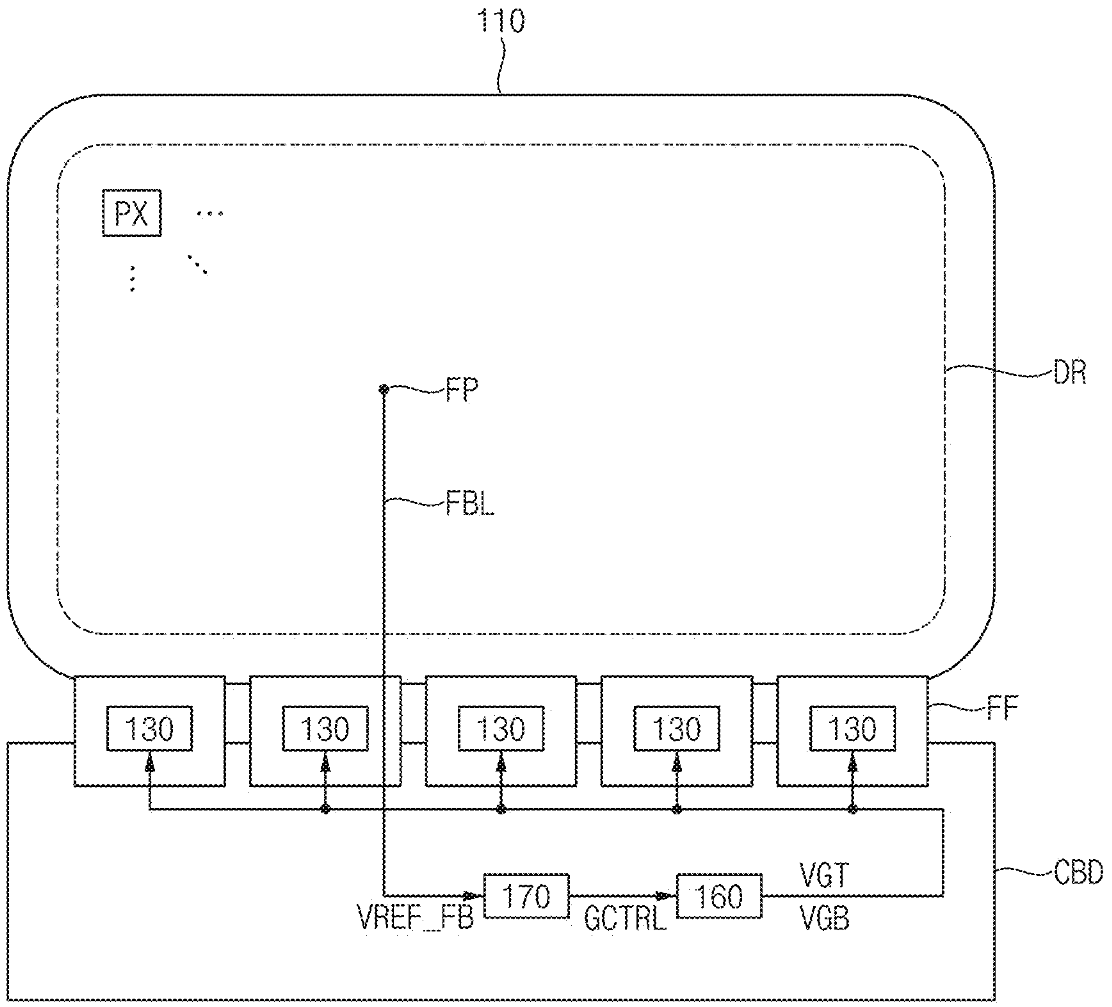
FIG. 10 is a block diagram illustrating an example of a display device according to embodiments.
Figure 11:
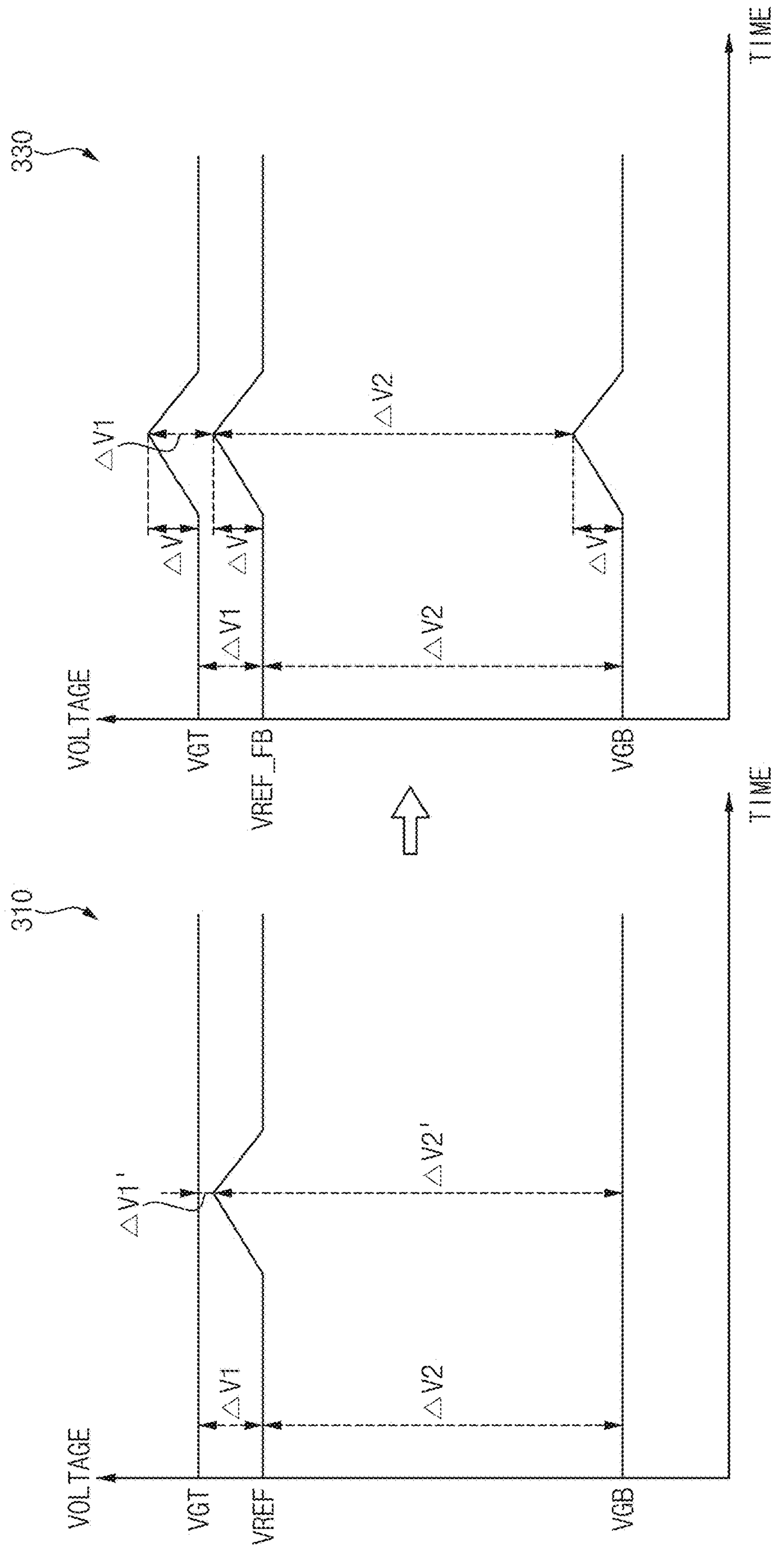
FIG. 11 is a timing diagram illustrating an example of a gamma top voltage, a gamma bottom voltage and a reference voltage in a conventional display device, and an example of a gamma top voltage, a gamma bottom voltage and a feedback reference voltage in a display device according to embodiments.

FIG. 1 is a block diagram illustrating a display device according to embodiments, FIG. 2 is a circuit diagram illustrating an example of a pixel included in a display device according to embodiments, FIG. 3 is a timing diagram for describing an example of an operation of a pixel of FIG. 2, FIG. 4 is a circuit diagram for describing an example of an operation of a pixel of FIG. 2 in a gate initialization period, FIG. 5 is a circuit diagram for describing an example of an operation of a pixel of FIG. 2 in a compensation period, FIG. 6 is a circuit diagram for describing an example of an operation of a pixel of FIG. 2 in a writing period, FIG. 7 is a circuit diagram for describing an example of an operation of a pixel of FIG. 2 in an anode initialization period, FIG. 8 is a circuit diagram for describing an example of an operation of a pixel of FIG. 2 in an emission period, FIG. 9 is a timing diagram for describing an example of a change or a ripple of a reference voltage according to a change or a transition of a data voltage, FIG. 10 is a block diagram illustrating an example of a display device according to embodiments, and FIG. 11 is a timing diagram illustrating an example of a gamma top voltage, a gamma bottom voltage and a reference voltage in a conventional display device, and an example of a gamma top voltage, a gamma bottom voltage and a feedback reference voltage in a display device according to embodiments.

Referring to FIG. 1, a display device 100 may include a display panel 110 that includes a plurality of pixels PX, and a panel driver 120 that drives the display panel 110. In some embodiments, the panel driver 120 may include a data driver 130 that provides data voltages VDAT to the plurality of pixels PX, a scan driver 140 that provides scan signals SS to the plurality of pixels PX, an emission driver 150 that provides emission signals EM to the plurality of pixels PX, a power management circuit 160 that generates voltages VGT, VGB, ELVDD, ELVSS, VINT and VREF for driving the display panel 110, and a controller 170 that controls the data driver 130, the scan driver 140, the emission driver 150 and the power management circuit 160.

The display panel 110 may include the plurality of pixels PX in a display region DR. Each pixel PX may generate an emission current based on a voltage difference between the data voltage VDAT and a reference voltage VREF, and may emit light with a luminance corresponding to a current level of the emission current based on the emission current. In some embodiments, as illustrated in FIG. 2, each pixel PX may include a first capacitor C1, a second capacitor C2, a first transistor T1, a second transistor T2, a third transistor T3, a fourth transistor T4, a fifth transistor T5 and a light-emitting element EL. In some embodiments, each pixel PX may further include a sixth transistor T6 and a seventh transistor T7.

The first capacitor C1 may be connected between a line which transfers a first power supply voltage ELVDD (e.g., a high power supply voltage) and a first node N1, and the second capacitor C2 may be connected between the first node N1 and a second node N2. In some embodiments, the first capacitor C1 may be referred to as a storage capacitor, and the second capacitor C2 may be referred to as a hold capacitor. Further, in some embodiments, the first capacitor C1 may include a first electrode which receives the first power supply voltage ELVDD, and a second electrode connected to the first node N1, and the second capacitor C2 may include a first electrode connected to the first node N1, and a second electrode connected to the second node N2.

The first transistor T1 may generate the emission current based on the voltage of the second node N2. In some embodiments, as described below with reference to FIG. 8, the first transistor T1 may generate the emission current IEL having a current level corresponding to a voltage difference VREF−VDAT between the data voltage VDAT and the reference voltage VREF. Further, in some embodiments, the first transistor T1 may be referred to as a driving transistor. In some embodiments, the first transistor T1 may include a gate connected to the second node N2, a first terminal which receives the first power supply voltage ELVDD, and a second terminal connected to the third and sixth transistors T3 and T6.

The second transistor T2 may transfer the data voltage VDAT to the first node N1 in response to a write signal GW. In some embodiments, the second transistor T2 may be referred to as a scan transistor or a write transistor. Further, in some embodiments, the second transistor T2 may include a gate which receives the write signal GW, a first terminal connected to a data line DL, and a second terminal connected to the first node N1.

The third transistor T3 may diode-connect the first transistor T1 in response to a compensation signal GC. In some embodiments, the third transistor T3 may be referred to as a compensation transistor. Further, in some embodiments, the third transistor T3 may include a gate which receives the compensation signal GC, a first terminal connected to the second terminal of the first transistor T1, and a second terminal connected to the second node N2.

The fourth transistor T4 may apply an initialization voltage VINT to the second node N2 in response to an initialization signal GI. In some embodiments, the fourth transistor T4 may be referred to as a gate initialization transistor. Further, in some embodiments, the fourth transistor T4 may include a gate which receives the initialization signal GI, a first terminal connected to the second node N2, and a second terminal which receives the initialization voltage VINT.

The fifth transistor T5 may apply the reference voltage VREF to the first node N1 in response to the compensation signal GC. In some embodiments, the fifth transistor T5 may be referred to as a reference transistor. Further, in some embodiments, the fifth transistor T5 may include a gate which receives the compensation signal GC, a first terminal connected to the first node N1, and a second terminal which receives the reference voltage VREF.

The sixth transistor T6 may be located between the first transistor T1 and the light-emitting element EL, and may connect the first transistor T1 and the light-emitting element EL to each other in response to the emission signal EM. In some embodiments, the sixth transistor T6 may be referred to as an emission transistor. Further, in some embodiments, the sixth transistor T6 may include a gate which receives the emission signal EM, a first terminal connected to the second terminal of the first transistor T1, and a second terminal connected to an anode of the light-emitting element EL.

The seventh transistor T7 may apply the initialization voltage VINT to the anode of the light-emitting element EL in response to a bypass signal GB. In some embodiments, the seventh transistor T7 may be referred to as an anode initialization transistor. Further, in some embodiments, the seventh transistor T7 may include a gate which receives the bypass signal GB, a first terminal connected to the anode of the light-emitting element EL, and a second terminal which receives the initialization voltage VINT. Although FIG. 2 illustrates an example in which the fourth and seventh transistors T4 and T7 receive the same initialization voltage VINT, in other embodiments, the fourth transistor T4 may receive a gate initialization voltage, and the seventh transistor T7 may receive an anode initialization voltage different from the gate initialization voltage.

The light-emitting element EL may emit light based on the emission current generated by the first transistor T1. In some embodiments, the light-emitting element EL may be, but is not limited to, an organic light-emitting diode ("OLED"). In other embodiments, the light-emitting element EL may be any suitable light-emitting element. For example, the light-emitting element EL may be a micro light-emitting diode, a nano light-emitting diode ("nano-LED"), a quantum dot ("QD") light-emitting diode, an inorganic light-emitting diode, or any other suitable light-emitting element. In some embodiments, the light-emitting element EL may include the anode connected to the second terminal of the first transistor T1 through the sixth transistor T6, and a cathode which receives a second power supply voltage ELVSS (e.g., a low power supply voltage).

In some embodiments, as illustrated in FIG. 2, the first through seventh transistors T1 through T7 may be implemented as P-type metal-oxide-semiconductor ("PMOS") transistors, but are not limited thereto. In other embodiments, at least one of the first through seventh transistors T1 through T7 may be implemented as an N-type metal-oxide-semiconductor ("NMOS") transistor.

In some embodiments, as illustrated in FIG. 3, a frame period FRP for the display device 100 may include a gate initialization period GIP in which the second node N2 is initialized, a compensation period CP in which a threshold voltage compensation operation for the first transistor T1 is performed, a writing period WP in which the data voltage VDAT is provided to the pixel PX, an anode initialization period AIP in which the light-emitting element EL is initialized, and an emission period EP in which the light-emitting element EL emits light based on the emission current.

In the gate initialization period GIP, the emission signal EM, the compensation signal GC, the write signal GW and the bypass signal GB may have an off-level (e.g., a high level), and the initialization signal GI may have an on-level (e.g., a low level). For example, as illustrated in FIG. 4, the fourth transistor T4 may be turned on in response to the initialization signal GI, and may transfer the initialization voltage VINT to the second node N2. Thus, the second node N2 (or a gate node of the first transistor T1) may be initialized based on the initialization voltage VINT. Further, the first, second, third, fifth, sixth and seventh transistors T1, T2, T3, T5, T6 and T7 may be turned off.

In the compensation period CP, the emission signal EM, the initialization signal GI, the write signal GW and the bypass signal GB may have the off-level, and the compensation signal GC may have the on-level. For example, as illustrated in FIG. 5, the third and fifth transistors T3 and T5 may be turned on in response to the compensation signal GC. The third transistor T3 may diode-connect the first transistor T1, and the fifth transistor T5 may transfer the reference voltage VREF to the first node N1. When the first transistor T1 is diode-connected, the first transistor T1 may be turned on until a voltage of the second node N2 becomes a voltage ELVDD-VTH obtained by subtracting a threshold voltage VTH of the first transistor T1 from the first power supply voltage ELVDD. Thus, a voltage of the first node N1 may become the reference voltage VREF, and the voltage of the second node N2 may become the voltage ELVDD-VTH obtained by subtracting the threshold voltage VTH of the first transistor T1 from the first power supply voltage ELVDD. Accordingly, the second capacitor C2 may store the voltage ELVDD-VTH in which the threshold voltage VTH of the first transistor T1 is reflected, and this operation may be referred to as a source follower-type "threshold voltage compensation operation" for the first transistor T1. Further, the second, fourth, sixth and seventh transistors T2, T4, T6 and T7 may be turned off.

In the writing period WP, the emission signal EM, the initialization signal GI, the compensation signal GC and the bypass signal GB may have the off-level, and the write signal GW may have the on-level. For example, as illustrated in FIG. 6, the second transistor T2 may be turned on in response to the write signal GW, and may transfer the data voltage VDAT from the data line DL to the first node N1. Thus, the voltage of the first node N1 may be changed from the reference voltage VREF to the data voltage VDAT by a voltage difference VDAT−VREF between the data voltage VDAT and the reference voltage VREF. Further, when the voltage of the first node N1 connected to the first electrode of the second capacitor C2 is changed by the voltage difference VDAT−VREF between the data voltage VDAT and the reference voltage VREF, by coupling of the second capacitor C2, the voltage of the second node N2 connected to the second electrode of the second capacitor C2 also may be changed by the voltage difference VDAT−VREF between the data voltage VDAT and the reference voltage VREF. Accordingly, the voltage of the second node N2 may become "ELVDD−VTH+VDAT−VREF". Further, the third, fourth, fifth, sixth and seventh transistors T3, T4, T5, T6 and T7 may be turned off.

In the anode initialization period AIP, the emission signal EM, the initialization signal GI, the compensation signal GC and the write signal GW may have the off-level, and the bypass signal GB may have the on-level. For example, as illustrated in FIG. 7, the seventh transistor T7 may be turned on in response to the bypass signal GB, and may transfer the initialization voltage VINT to the anode of the light-emitting element EL. Thus, the anode of the light-emitting element EL may be initialized based on the initialization voltage VINT. Further, the second, third, fourth, fifth and sixth transistors T2, T3, T4, T5 and T6 may be turned off.

In the emission period EP, the initialization signal GI, the compensation signal GC, the write signal GW and the bypass signal GB may have the off-level, and the emission signal EM may have the on-level. For example, as illustrated in FIG. 8, the first transistor T1 may be turned on based on the voltage of the second node N2, and the sixth transistor T6 may be turned on in response to the emission signal EM. Further, a source-gate voltage of the first transistor T1 may be a voltage (i.e., "VTH+VREF−VDAT") obtained by subtracting the voltage (i.e., "ELVDD−VTH+VDAT−VREF") of the second node N2 from the first power supply voltage ELVDD, and the first transistor T1 may generate the emission current IEL corresponding to a voltage (i.e., "VREF−VDAT") obtained by subtracting the threshold voltage VTH of the first transistor T1 from the source-gate voltage (i.e., "VTH+VREF−VDAT"). That is, the emission current IEL generated by the first transistor T1 may be determined by an equation "$IEL=k\boxtimes (VREF-VDAT)^2$", where IEL represents the emission current, VREF represents the reference voltage, VDAT represents the data voltage, and k is a coefficient which is determined according to a mobility, an oxide capacitance, a channel width, a channel length, etc. of the first transistor T1. Accordingly, the emission current IEL generated by the first transistor T1 may be determined based on the voltage difference VREF-VDAT between the data voltage VDAT and the reference voltage VREF. The sixth transistor T6 may transfer the emission current IEL generated by the first transistor T1 to the light-emitting element EL, and the light-emitting element EL may emit light based on the emission current IEL generated by the first transistor T1. Further, the second, third, fourth, fifth and seventh transistors T2, T3, T4, T5 and T7 may be turned off.

Although FIG. 2 illustrates an example of the pixel PX included in the display device 100 according to embodiments, the pixel PX included in the display device 100 according to embodiments is not limited to the example of FIG. 2. Further, although FIG. 3 illustrates an example of signals EM, GI, GC, GW and GB applied to the pixel PX included in the display device 100 according to embodiments, the signals EM, GI, GC, GW and GB applied to the pixel PX included in the display device 100 according to embodiments are not limited to the example of FIG. 3.

Referring again to FIG. 1, the display panel 110 may further include a feedback line FBL connected to a point FP (e.g., a feedback point) within the display region DR. For example, the feedback line FBL may be connected to a line which transfers the reference voltage VREF at the point FP within the display region DR, and thus the reference voltage VREF at the point FP within the display region DR may be transferred as a feedback reference voltage VREF_FB through the feedback line FBL.

The data driver 130 may receive a gamma top voltage VGT and a gamma bottom voltage VGB from the power management circuit 160, may receive output image data ODAT and a data control signal DCTRL from the controller 170, and may provide the data voltages VDAT to the plurality of pixels PX based on the gamma top voltage VGT, the gamma bottom voltage VGB, the output image data ODAT and the data control signal DCTRL. In some embodiments, the data control signal DCTRL may include, but is not limited to, an output data enable signal, a horizontal start signal and a load signal. Further, in some embodiments, the data driver 130 may generate a plurality of gray voltages corresponding to a plurality of gray levels (e.g., 256 gray levels from a 0-gray level to a 255-gray level), respectively, by dividing a voltage between the gamma top voltage VGT and the gamma bottom voltage VGB to, and may provide the gray voltages corresponding to gray levels indicated by the output image data ODAT as the data voltages VDAT to the plurality of pixels PX. Here, the gamma top voltage VGT may refer to a gamma voltage with its maximum value, and the gamma bottom voltage VGB may refer to a gamma voltage with its minimum value. In some embodiments, the data driver 130 and the controller 170 may be implemented as a single integrated circuit, and the single integrated circuit may be referred to as a timing controller embedded data driver ("TED") integrated circuit. In other embodiments, the data driver 130 and the controller 170 may be implemented as separate integrated circuits.

The scan driver 140 may generate the scan signals SS based on a scan control signal SCTRL received from the controller 170, and may sequentially provide the scan signals SS to the plurality of pixels PX on a row-by-row basis. In some embodiments, the scan control signal SCTRL may include, but is not limited to, a scan start signal, a scan clock signal, etc. Further, in some embodiments, the scan signals SS provided to each pixel PX may include, but are not limited to, the initialization signal GI, the compensation signal GC, the write signal GW and the bypass signal GB illustrated in FIGS. 1 through 3. In some embodiments, the scan driver 140 may be integrated or formed in the display panel 110 (e.g., in a peripheral region of the display panel 110 adjacent to the display region DR). In other embodiments, the scan driver 140 may be implemented with one or more integrated circuits.

The emission driver 150 may generate the emission signals EM based on an emission control signal EMCTRL received from the controller 170, and may sequentially provide the emission signals EM to the plurality of pixels PX on a row-by-row basis. In some embodiments, the emission control signal EMCTRL may include, but is not limited to, an emission start signal, an emission clock signal, etc. Further, in some embodiments, the emission driver 150 may be integrated or formed in the display panel 110 (e.g., in the peripheral region of the display panel 110 adjacent to the display region DR). In other embodiments, the emission driver 150 may be implemented with one or more integrated circuits.

The power management circuit 160 may generate voltages VGT, VGB, ELVDD, ELVSS, VINT and VREF for driving the display panel 110. For example, the power management circuit 160 may generate the gamma top voltage VGT and the gamma bottom voltage VGB provided to the data driver 130, and may generate the first power supply voltage ELVDD, the second power supply voltage ELVSS, the initialization voltage VINT and the reference voltage VREF provided to the display panel 110. In some embodiments, as described below with reference to FIGS. 10 and 11, the power management circuit 160 may receive a gamma control signal GCTRL from the controller 170, and may adjust the gamma top voltage VGT and the gamma bottom voltage VGB provided to the data driver 130 in response to the gamma control signal GCTRL. Further, in some embodiments, the power management circuit 160 may be implemented as a power management integrated circuit ("PMIC"), but is not limited thereto. In other embodiments, the power management circuit 160 may be included in the controller 170 and/or the data driver 130.

The controller 170 (e.g., a timing controller) may receive input image data IDAT and a control signal CTRL from an external processor (e.g., a graphics processing unit ("GPU"), an application processor ("AP") or a graphics card). In some embodiments, the control signal CTRL may include, but is not limited to, a vertical synchronization signal, a horizontal synchronization signal, an input data enable signal, a master clock signal, etc. The controller 170 may generate the output image data ODAT, the data control signal DCTRL, the scan control signal SCTRL and the emission control signal EMCTRL based on the input image data IDAT and the control signal CTRL. The controller 170 may control the data driver 130 by providing the output image data ODAT and the data control signal DCTRL to the data driver 130, may control the scan driver 140 by providing the scan control signal SCTRL to the scan driver 140, and may control the emission driver 150 by providing the emission control signal EMCTRL to the emission driver 150.

As illustrated in FIG. 9, when the data voltage VDAT provided through the data line DL is changed or transitioned, the reference voltage VREF may be changed or have ripples due to coupling between the data line DL and the line which transfers the reference voltage VREF. For example, when the data voltage VDAT has a falling edge 210 that decreases from a high voltage level (e.g., corresponding to a relatively low gray level) to a low voltage level (e.g., corresponding to a relatively high gray level), the reference voltage VREF also may have a falling edge 230 or the ripple due to the coupling. A pixel PX that receives a compensation signal GC which changes from the on-level (e.g., the low level) to the off-level (e.g., the high level) when the reference voltage VREF has the falling edge 230 may store the reference voltage VREF having a voltage level lower than a desired voltage level. The pixel PX that stores the reference voltage VREF having the voltage level lower than the desired voltage level may emit light with a luminance lower than a desired luminance. Further, a pixel PX that stores the reference voltage VREF having a voltage level higher than the desired voltage level may emit light with a luminance higher than the desired luminance. Accordingly, a change or a ripple of the reference voltage VREF may occur due to a change or a transition of the data voltage VDAT, and a crosstalk defect may occur due to the change or the ripple of the reference voltage VREF.

However, in the display device 100 according to embodiments, the panel driver 120 (or the controller 170) may receive the reference voltage VREF at the point FP in the display region DR as the feedback reference voltage VREF_FB through the feedback line FBL, and may adjust the data voltage VDAT according to the feedback reference voltage VREF_FB. For example, as illustrated in FIG. 10, the feedback line FBL of the display panel 110 may be connected to the point FP in the display region DR where the plurality of pixels PX are formed, may pass through a flexible film FF on which the data driver 130 is mounted, and may be connected to the controller 170 mounted on a control board CBD. The controller 170 may receive the feedback reference voltage VREF_FB through the feedback line FBL, and may generate the gamma control signal GCTRL based on the feedback reference voltage VREF_FB. The power management circuit 160 may adjust the gamma top voltage VGT and the gamma bottom voltage VGB in response to the gamma control signal GCTRL. The data driver 130 may adjust the data voltage VDAT based on the adjusted gamma top voltage VGT and the adjusted gamma bottom voltage VGB. In some embodiments, the panel driver 120 may increase the data voltage VDAT as the feedback reference voltage VREF_FB increases, and may decrease the data voltage VDAT as the feedback reference voltage VREF_FB decreases. For example, as the feedback reference voltage VREF_FB increases, the controller 170 may generate the gamma control signal GCTRL indicating that the gamma top voltage VGT and the gamma bottom voltage VGB are to be increased, the power management circuit 160 may increase the gamma top voltage VGT and the gamma bottom voltage VGB in response to the gamma control signal GCTRL, and the data driver 130 may increase the data voltage VDAT based on the increased gamma top voltage VGT and the increased gamma bottom voltage VGB.

A first timing diagram 310 of FIG. 11 illustrates an example of the gamma top voltage VGT, the gamma bottom voltage VGB and the reference voltage VREF in a conventional display device, and a second timing diagram 330 of FIG. 11 illustrates an example of the gamma top voltage VGT, the gamma bottom voltage VGB and the feedback reference voltage VREF_FB in the display device 100 according to embodiments. In the conventional display device, as illustrated in the first timing diagram 310 of FIG. 11, even if the reference voltage VREF is changed, the gamma top voltage VGT and the gamma bottom voltage VGB may not be adjusted. Thus, when the reference voltage VREF is increased, the gamma top voltage VGT may have a voltage difference ΔV1' less than a desired first voltage difference ΔV1 with respect to the reference voltage VREF, and the gamma bottom voltage VGB may have a voltage difference ΔV2' greater than a desired second voltage difference ΔV2 with respect to the reference voltage VREF. In this case, the data voltage VDAT generated based on the gamma top voltage VGT and the gamma bottom voltage VGB may not be changed, the reference voltage VREF may be increased, and thus a pixel PX receiving the increased reference voltage VREF may emit light with a luminance higher than a desired luminance.

However, in the display device 100 according to embodiments, as illustrated in the second timing diagram 330 of FIG. 11, when the feedback reference voltage VREF_FB is increased by a voltage increase amount ΔV, the power management circuit 160 may increase each of the gamma top voltage VGT and the gamma bottom voltage VGB by the voltage increase amount ΔV. Accordingly, the gamma top voltage VGT may maintain the desired first voltage difference ΔV1 with respect to the reference voltage VREF, and the gamma bottom voltage VGB may maintain the desired second voltage difference ΔV2 with respect to the reference voltage VREF. Further, the data driver 130 may increase the data voltage VDAT by the voltage increase amount ΔV based on the gamma top voltage VGT increased by the voltage increase amount ΔV and the gamma bottom voltage VGB increased by the voltage increase amount ΔV. Accordingly, even if the reference voltage VREF is increased by the voltage increase amount ΔV, since the data voltage VDAT is also increased by the voltage increase amount ΔV, each pixel PX may emit light with the desired luminance (no luminance difference with respect to the desired luminance), and the crosstalk defect caused by the change or the ripple of the reference voltage VREF may be effectively prevented or reduced.

As described above, in the display device 100 according to embodiments, the panel driver 120 may receive the reference voltage VREF at the point FP in the display region DR as the feedback reference voltage VREF_FB through the feedback line FBL, and may adjust the data voltage VDAT according to the feedback reference voltage VREF_FB. Accordingly, the crosstalk defect caused by the change or the ripple of the reference voltage VREF may be effectively prevented or reduced.

Figure 12:
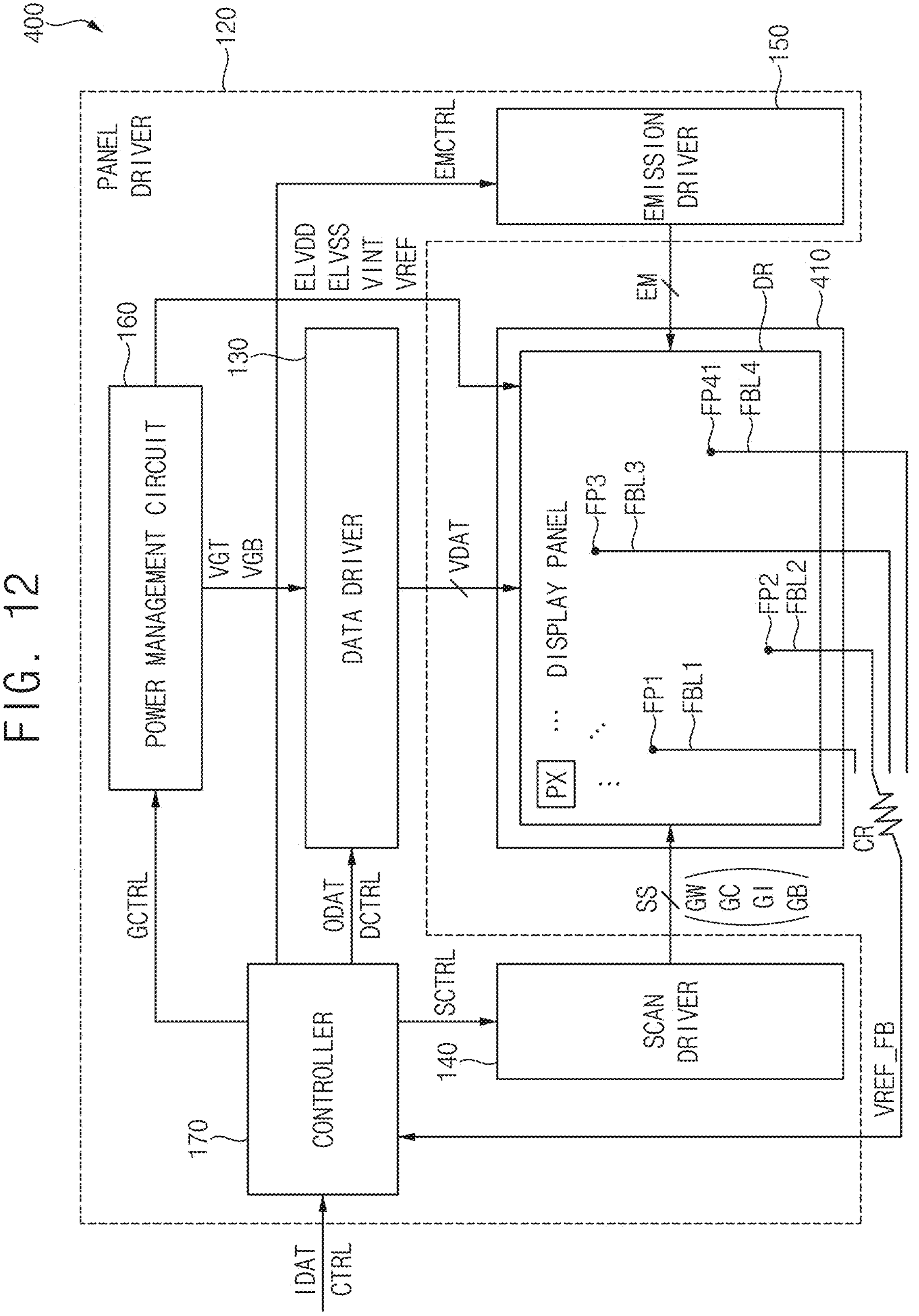
FIG. 12 is a block diagram illustrating a display device according to embodiments.
Figure 13:
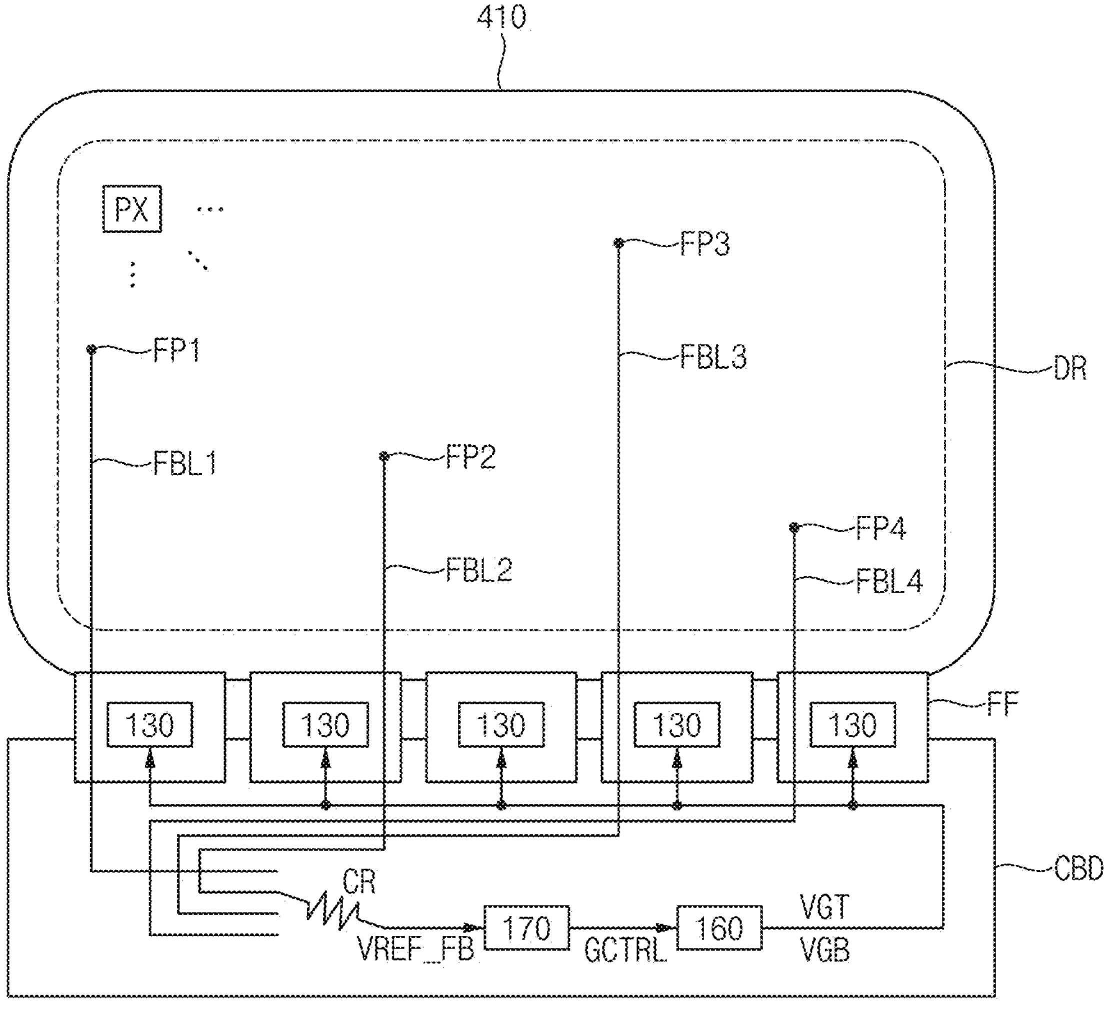
FIG. 13 is a block diagram illustrating an example of a display device according to embodiments.

FIG. 12 is a block diagram illustrating a display device according to embodiments, and FIG. 13 is a block diagram illustrating an example of a display device according to embodiments.

Referring to FIG. 12, a display device 400 may include a display panel 410 and a panel driver 120. The panel driver 120 may include a data driver 130, a scan driver 140, an emission driver 150, a power management circuit 160 and a controller 170. The display device 400 of FIG. 12 may have substantially the same structure and substantially the same operation as a display device 100 of FIG. 1, except that the display panel 410 may include a plurality of feedback lines FBL1, FBL2, FBL3 and FBL4 connected to a plurality of points FP1, FP2, FP3 and FP4, respectively, within a display region DR, and the panel driver 120 (or the controller 170) is connected to one feedback line (e.g., FBL2) selected from among the plurality of feedback lines FBL1, FBL2, FBL3 and FBL4.

The panel driver 120 may receive a reference voltage VREF within the display region DR as a feedback reference voltage VREF_FB through one feedback line (e.g., FBL2) selected from among the plurality of feedback lines FBL1, FBL2, FBL3 and FBL4, and may adjust a data voltage VDAT according to the feedback reference voltage VREF_FB. In some embodiments, the panel driver 120 may increase the data voltage VDAT as the feedback reference voltage VREF_FB increases, and may decrease the data voltage VDAT as the feedback reference voltage VREF_FB decreases. Further, in some embodiments, the one feedback line connected to the panel driver 120 (or the controller 170) may be selected from among the plurality of feedback lines FBL1, FBL2, FBL3 and FBL4 according to a crosstalk characteristic of the display panel 410. For example, during a manufacturing process of the display device 400, a minimum data voltage corresponding to a maximum gray level (e.g., a 255-gray level) and a maximum data voltage corresponding to a minimum gray level (e.g., a 0-gray level) may be alternately provided to respective pixel rows of the display panel 410, a luminance of the display panel 410 may be measured, and a pixel row having the largest crosstalk defect among the respective pixel rows of the display panel 410 may be determined, and a feedback line (e.g., FBL2) connected to a point (e.g., FP2) adjacent to the pixel row having the largest crosstalk defect among the plurality of feedback lines FBL1, FBL2, FBL3 and FBL4 may be connected to the controller 170. Further, in some embodiments, the feedback line (e.g., FBL2) may be connected to the controller 170 through a connection resistor CR. For example, the connection resistor CR may have a resistance value lower than a reference resistance value, and may have a resistance value close to a resistance value of about 0Ω, but is not limited thereto.

For example, as illustrated in FIG. 13, the controller 170 may be connected to one feedback line (e.g., FBL2) selected from among the plurality of feedback lines FBL1, FBL2, FBL3 and FBL4 that are connected to the plurality of points FP1, FP2, FP3 and FP4, respectively, within the display region DR through the connection resistor CR, and may not be connected to the remaining feedback lines (e.g., FBL1, FBL3 and FBL4). The controller 170 may receive the feedback reference voltage VREF_FB through the selected one feedback line (e.g., FBL2), and may generate a gamma control signal GCTRL based on the feedback reference voltage VREF_FB. The power management circuit 160 may adjust a gamma top voltage VGT and a gamma bottom voltage VGB in response to the gamma control signal GCTRL. The data driver 130 may adjust the data voltage VDAT based on the adjusted gamma top voltage VGT and the adjusted gamma bottom voltage VGB.

As described above, in the display device 400 according to embodiments, the panel driver 120 may receive the reference voltage VREF at a point (e.g., FP2) within the display region DR as the feedback reference voltage VREF_FB through one feedback line (e.g., FBL2) selected from among the plurality of feedback lines FBL1, FBL2, FBL3 and FBL4, and may adjust the data voltage VDAT according to the feedback reference voltage VREF_FB. Accordingly, a crosstalk defect caused by a change or a ripple of the reference voltage VREF may be effectively prevented or reduced.

Figure 14:
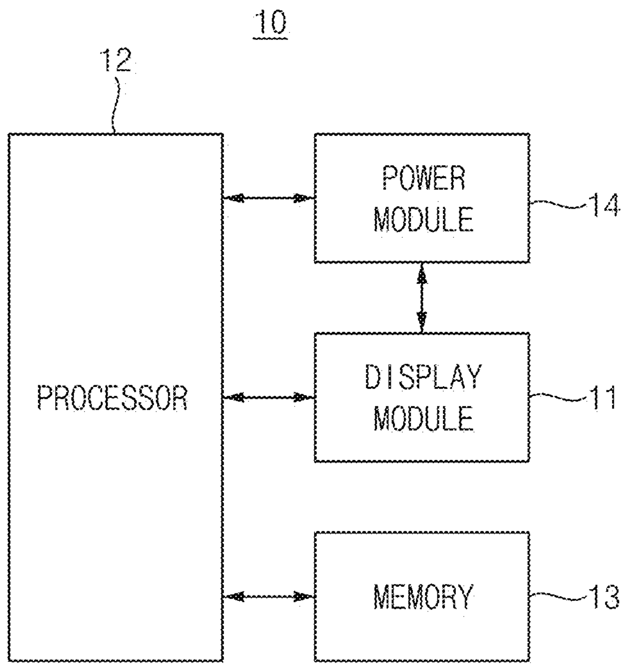
FIG. 14 is a block diagram illustrating an electronic device according to embodiments.

FIG. 14 is a block diagram illustrating an electronic device according to embodiments.

Referring to FIG. 14, an electronic device 10 according to embodiments may include a display module 11, a processor 12, a memory 13 and a power module 14.

The processor 12 may include at least one of a central processing unit ("CPU"), an application processor ("AP"), a graphics processing unit ("GPU"), a communication processor ("CP"), an image signal processor ("ISP") and a controller.

The memory 13 may store data information for an operation of the processor 12 or the display module 11. When the processor 12 executes an application stored in the memory 13, an image data signal and/or an input control signal may be transferred to the display module 11, and the display module 11 may output image information through a display screen by processing the received signal.

The power module 14 may include a power supply module such as a power adapter or a battery device, and a power conversion module that converts power supplied by the power supply module to generate power for an operation of the electronic device 10.

At least one of components of the electronic device 10 described above may be included in the display device described above according to embodiments. Further, some of individual modules functionally included in one module may be included in the display device, and other modules may be provided separately from the display device. For example, the display device may include the display module 11, and the processor 12, the memory 13 and the power module 14 may be provided in the form of other devices within the electronic device 10 other than the display device.

Figure 15:
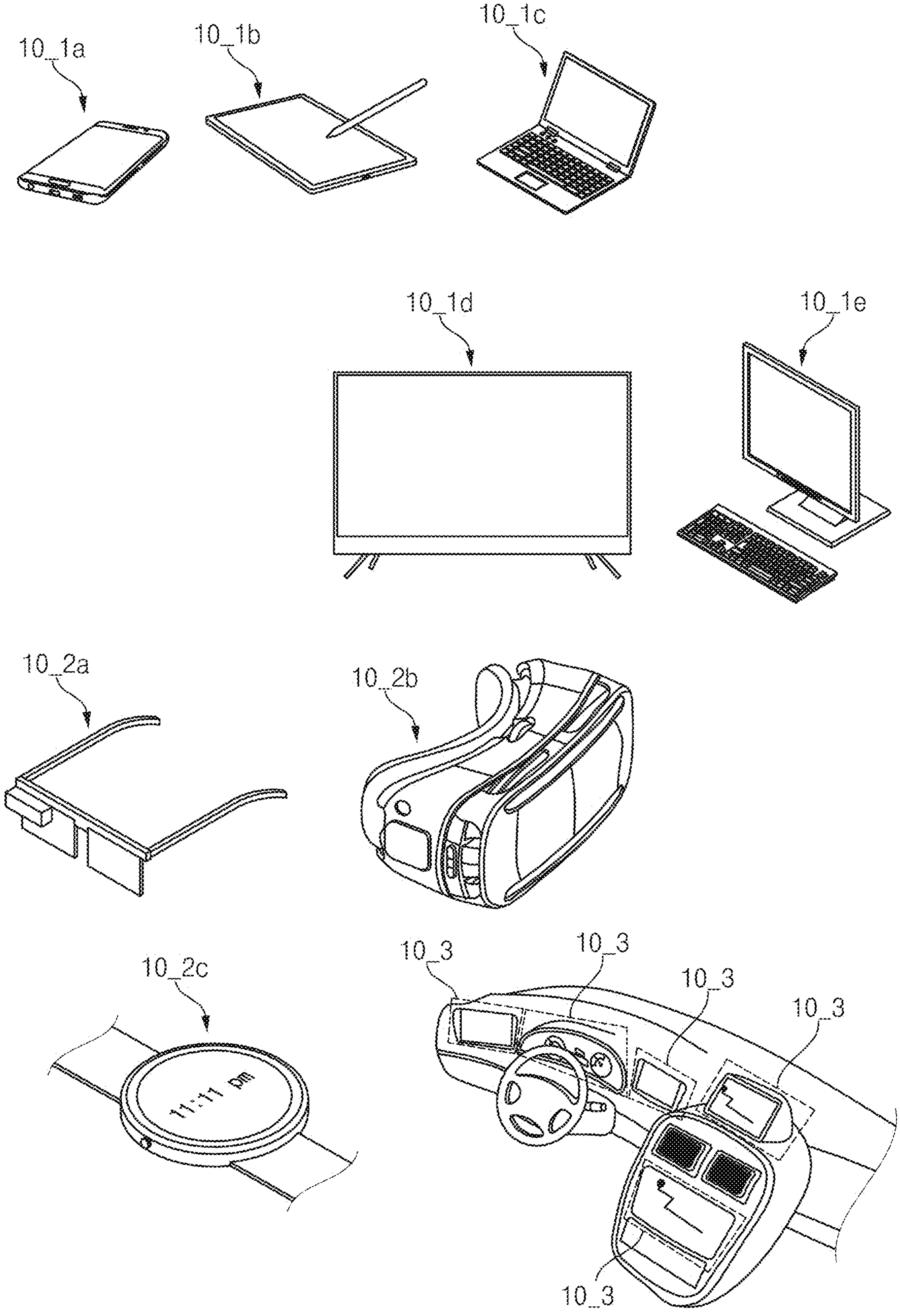
FIG. 15 is a schematic diagram illustrating electronic devices according to various embodiments.

FIG. 15 is a schematic diagram illustrating electronic devices according to various embodiments.

Referring to FIG. 15, various electronic devices to which the display device according to embodiments is applied may include not only image display electronic devices such as a smart phone 10_1*a*, a tablet personal computer ("PC") 10_1*b*, a laptop 10_1*c*, a television ("TV") 10_1*d* and a desk monitor 10_1*e*, but also wearable electronic devices including display modules such as smart glasses 10_2*a*, a head mounted display 10_2*b* and a smart watch 10_2*c*, and vehicle electronic devices 10_3 including display modules such as a center information display ("CID") arranged on an instrument panel, center fascia and dashboard of an automobile, and a room mirror display.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels in a display region, and a feedback line connected to a point within the display region; and a panel driver, which drives the display panel, wherein each of the plurality of pixels generates an emission current based on a voltage difference between a data voltage and a reference voltage, and emits light with a luminance corresponding to the emission current, and wherein the panel driver receives the reference voltage at the point within the display region as a feedback reference voltage through the feedback line, and adjusts the data voltage according to the feedback reference voltage.

2. The display device of claim 1, wherein the panel driver increases the data voltage as the feedback reference voltage increases, and decreases the data voltage as the feedback reference voltage decreases.

3. The display device of claim 1, wherein the panel driver includes:

a power management circuit, which generates the reference voltage, a gamma top voltage and a gamma bottom voltage;

a data driver, which generates the data voltage based on the gamma top voltage and the gamma bottom voltage, and provides the data voltage to each of the plurality of pixels; and a controller, which controls the power management circuit and the data driver.

4. The display device of claim 3, wherein the controller receives the feedback reference voltage through the feedback line, and generates a gamma control signal based on the feedback reference voltage, wherein the power management circuit adjusts the gamma top voltage and the gamma bottom voltage in response to the gamma control signal, and wherein the data driver adjusts the data voltage based on the adjusted gamma top voltage and the adjusted gamma bottom voltage.

5. The display device of claim 4, wherein, as the feedback reference voltage increases, the controller generates the gamma control signal, which indicates that the gamma top voltage and the gamma bottom voltage are to be increased, the power management circuit increases the gamma top voltage and the gamma bottom voltage in response to the gamma control signal, and the data driver increases the data voltage based on the increased gamma top voltage and the increased gamma bottom voltage.

6. The display device of claim 5, wherein, when the feedback reference voltage increases by a voltage increase amount, the power management circuit increases each of the gamma top voltage and the gamma bottom voltage by the voltage increase amount, and the data driver increases the data voltage by the voltage increase amount based on the increased gamma top voltage and the increased gamma bottom voltage.

7. The display device of claim 3, wherein the panel driver further includes:

a scan driver, which provides a write signal, a compensation signal, an initialization signal and a bypass signal to each of the plurality of pixels; and an emission driver, which provides an emission signal to each of the plurality of pixels.

8. The display device of claim 1, wherein each of the plurality of pixels includes:

a first capacitor including a first electrode which receives a first power supply voltage, and a second electrode connected to a first node;

a second capacitor including a first electrode connected to the first node, and a second electrode connected to a second node;

a first transistor, which generates the emission current based on a voltage of the second node;

a second transistor, which transfers the data voltage to the first node in response to a write signal;

a third transistor, which diode-connects the first transistor in response to a compensation signal;

a fourth transistor, which applies an initialization voltage to the second node in response to an initialization signal;

a fifth transistor, which applies the reference voltage to the first node in response to the compensation signal; and a light-emitting element, which emits light based on the emission current.

9. The display device of claim 8, wherein the first transistor includes a gate connected to the second node, a first terminal which receives the first power supply voltage, and a second terminal, wherein the second transistor includes a gate which receives the write signal, a first terminal connected to a data line, and a second terminal connected to the first node, wherein the third transistor includes a gate which receives the compensation signal, a first terminal connected to the second terminal of the first transistor, and a second terminal connected to the second node, wherein the fourth transistor includes a gate which receives the initialization signal, a first terminal connected to the second node, and a second terminal which receives the initialization voltage, wherein the fifth transistor includes a gate which receives the compensation signal, a first terminal connected to the first node, and a second terminal which receives the reference voltage, and wherein the light-emitting element includes an anode connected to the second terminal of the first transistor, and a cathode which receives a second power supply voltage.

10. The display device of claim 8, wherein each of the plurality of pixels further includes:

a sixth transistor located between the first transistor and the light-emitting element, and, which connects the first transistor and the light-emitting element in response to an emission signal; and a seventh transistor, which applies the initialization voltage to the light-emitting element in response to a bypass signal.

11. The display device of claim 10, wherein the sixth transistor includes a gate which receives the emission signal, a first terminal connected to the first transistor, and a second terminal connected to the light-emitting element, and wherein the seventh transistor includes a gate which receives the bypass signal, a first terminal connected to the light-emitting element, and a second terminal which receives the initialization voltage.

12. The display device of claim 10, wherein a frame period for the display device includes:

a gate initialization period in which the second node is initialized;

a compensation period in which a threshold voltage compensation operation for the first transistor is performed;

a writing period in which the data voltage is provided to each of the plurality of pixels;

an anode initialization period in which the light-emitting element is initialized; and an emission period in which the light-emitting element emits light based on the emission current.

13. A display device comprising:

a display panel including a plurality of pixels in a display region, and a plurality of feedback lines connected to a plurality of points, respectively, within the display region; and a panel driver, which drives the display panel, wherein each of the plurality of pixels generates an emission current based on a voltage difference between a data voltage and a reference voltage, and emits light with a luminance corresponding to the emission current, and wherein the panel driver receives the reference voltage within the display region as a feedback reference voltage through one feedback line among the plurality of feedback lines, and adjusts the data voltage according to the feedback reference voltage.

14. The display device of claim 13, wherein the panel driver increases the data voltage as the feedback reference voltage increases, and decreases the data voltage as the feedback reference voltage decreases.

15. The display device of claim 13, wherein the panel driver includes:

a power management circuit, which generates the reference voltage, a gamma top voltage and a gamma bottom voltage;

a data driver, which generates the data voltage based on the gamma top voltage and the gamma bottom voltage, and provides the data voltage to each of the plurality of pixels; and a controller, which controls the power management circuit and the data driver, and wherein the controller is connected to the one feedback line among the plurality of feedback lines, and is not connected to remaining feedback lines among the plurality of feedback lines.

16. The display device of claim 15, wherein the one feedback line connected to the controller is selected according to a crosstalk characteristic of the display panel from among the plurality of feedback lines.

17. An electronic device comprising:

a processor;

a memory connected to the processor;

a power module connected to the processor; and a display device, which receives input image data from the processor, and displays an image based on the input image data, the display device comprising:

a display panel including a plurality of pixels in a display region, and a feedback line connected to a point within the display region; and a panel driver, which drives the display panel, wherein each of the plurality of pixels generates an emission current based on a voltage difference between a data voltage and a reference voltage, and emits light with a luminance corresponding to the emission current, and wherein the panel driver receives the reference voltage at the point within the display region as a feedback reference voltage through the feedback line, and adjusts the data voltage according to the feedback reference voltage.

18. The electronic device of claim 17, wherein the panel driver increases the data voltage as the feedback reference voltage increases, and decreases the data voltage as the feedback reference voltage decreases.

19. The electronic device of claim 17, wherein the panel driver includes:

a power management circuit, which generates the reference voltage, a gamma top voltage and a gamma bottom voltage;

a data driver, which generates the data voltage based on the gamma top voltage and the gamma bottom voltage, and provides the data voltage to each of the plurality of pixels; and a controller, which controls the power management circuit and the data driver.

20. The electronic device of claim 19, wherein the controller receives the feedback reference voltage through the feedback line, and generates a gamma control signal based on the feedback reference voltage, wherein the power management circuit adjusts the gamma top voltage and the gamma bottom voltage in response to the gamma control signal, and wherein the data driver adjusts the data voltage based on the adjusted gamma top voltage and the adjusted gamma bottom voltage.

* * * * *